Aug. 30, 1932. A. V. ROWE 1,875,159
CULTIVATOR
Filed Aug. 6, 1930
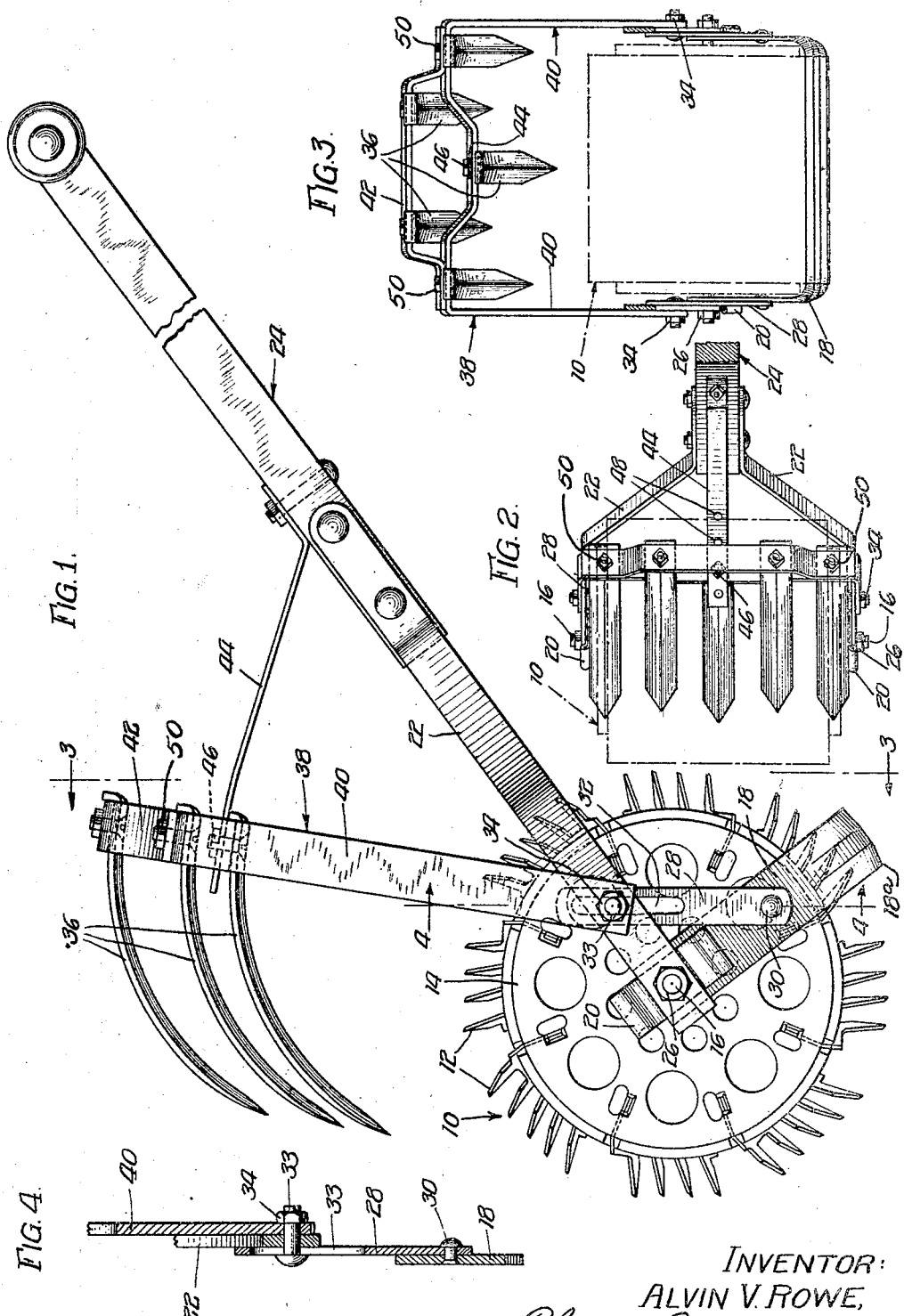
INVENTOR:
ALVIN V. ROWE,
BY Cheever, Cox & Moore
ATTYS.

Patented Aug. 30, 1932

1,875,159

UNITED STATES PATENT OFFICE

ALVIN V. ROWE, OF GALESBURG, ILLINOIS, ASSIGNOR TO ROWE MANUFACTURING COMPANY, OF GALESBURG, ILLINOIS, A CORPORATION OF ILLINOIS

CULTIVATOR

Application filed August 6, 1930. Serial No. 473,310.

My invention relates generally to garden tools and particularly to manually operable cultivators.

It is one of the primary objects of my present invention to provide a garden tool or cultivator which is provided with improved structural characteristics and which is capable of cultivating soil in a more expeditious manner.

It is an object of my invention to provide, in combination with a rotary cultivator tool, an improved scuffle knife construction whereby the cultivator may be manipulated with greater ease than cultivators of the conventional type.

More specifically, it is an object of my invention to provide a scuffle knife as above set forth which may be conveniently adjusted in accordance with the height at which the operating handle of the cultivator is raised by the operator when in use.

In addition to the improved adjustable scuffle knife structure, my invention contemplates the provision of an improved arrangement of shovels disposed oppositely from the scuffle knife, which are adapted to dig into the ground when the scuffle knife occupies its uppermost position.

A further object of my invention is to arrange the above mentioned scuffle knives in spaced relation so as to facilitate the loosening of earth therefrom during the operative association of said knives with the soil.

These and numerous other objects and advantages will be more apparent from the following detailed description when considered in connection with the accompanying drawing, wherein:

Figure 1 is a side elevational view of a cultivator which represents one embodiment of my invention;

Figure 2 is a fragmentary reduced plan view of the device shown in Figure 1, the rotary hoe points being shown by dot and dash lines;

Figure 3 is a reduced sectional view of the cultivator, said view being taken substantially along the line 3—3 of Figure 1, the rotary hoe points being designated by dot and dash lines; and Figure 4 is a detailed fragmentary sectional view taken substantially along the line 4—4 of Figure 1, disclosing the manner in which the scuffle knife is adjustably coupled with the yoke of the operating handle.

Referring now to the drawing more in detail, wherein like numerals have been employed to designate similar parts throughout the various figures, it will be noted that my invention contemplates the use of a reel designated generally by the numeral 10, which includes a plurality of hoe points 12 arranged in staggered relation, said hoe points being supported by suitable rotary side plates 14. The specific construction of this reel 10 does not form a part of the present invention except in so far as this reel enters into the general combination of the other elements associated therewith. This reel construction is covered in my co-pending application, Serial Number 326,949, filed December 19, 1928. In view of this fact, I have shown the reel or hoe point structure by dot and dash lines in Figures 2 and 3 in order more clearly to disclose those parts which comprise the present invention.

It will be seen that the reel 10 is supported upon a central axle or shaft 16, and this shaft 16 extends on opposite sides of the reel sufficiently to receive opposite extremities of a U-shaped member or scuffle knife 18. Disposed on the outer sides of the scuffle knife 18 are leaf spring members 20, which yieldingly bear against the sides of the scuffle knife. Oppositely disposed yoke members 22 of an operating handle 24 are clamped against the springs 20 by means of a suitable nut 26, as clearly shown in Figures 1 and 2.

Links 28, positioned on opposite sides of the reel 10, are pivotally connected at one extremity by means of suitable pins or rivets 30 at the outer side of the scuffle knife 18, and the opposite extremity of each link is provided with a longitudinal slot 32. This slot 32 cooperates with a pin 33 which extends through the yoke member 22 and said slot. By means of this construction, the scuffle knife may be adjustably pivoted around the axle or shaft 16 by first loosening nuts 34, which are carried by the pins 33. In operating cultivators of the type shown in the drawing, it is very important that the cutting edge 18ª of the scuffle knife 10 be properly positioned with respect to the hoe points 12. Thus with one setting of the scuffle knife, it may operate satisfactory in soil which is of a given hardness, but when the cultivator is used on soil of a different hardness, the same setting of the scuffle knife might not produce satisfactory results. If the scuffle knife digs into the soil a considerable distance, obviously the operation of the cultivator is rendered exceedingly difficult. Therefore it is very desirable to provide means whereby the scuffle knife may be adjusted to the position which will enable the cultivator to be operated most efficiently.

Another advantage resulting from the provision of the adjustable scuffle knife will be apparent when it is understood that the height of the person operating the cultivator obviously controls the position of the scuffle knife with respect to the surface of the soil. For instance, with a given setting of the scuffle knife, a tall person might push the cultivator with greater ease than a shorter person, for the reason that when a tall person is pushing, the handle is raised sufficiently to bring the scuffle knife in proper cutting relation with respect to the surface of the soil. However, with a shorter person, the handle might be lowered to such an extent as to cause the scuffle knife to make an exceptionally deep cut into the soil. With my improved adjustable scuffle knife feature, said knife may be conveniently adjusted to the height of the person by merely loosening the nuts 34 and shifting the knife to the desired position. Furthermore, if it is desired to use the cultivator for "blind cultivation", that is, cultivation with the use of only the hoe points 12, the scuffle knife may be shifted to an extreme upward position by reason of the slots 32, so as to position said knife out of engagement with the surface of the ground. In other words, for "blind cultivation" it is not necessary to completely remove the scuffle knife as has been necessary in using conventional types of cultivators.

Attention is also directed to shovels 36, which are mounted in spaced relation at their rear extremities upon a frame 38. This frame includes a U-shaped section 40 which extends on opposite sides of the yoke members 22 and is pivotally mounted upon the pins 33. The outer central portion of the frame section 40 is bent inwardly to provide a mounting for the central shovel, and the adjacent outer portions of this frame section 40 serve to support the two outermost shovels. A second U-shaped frame section 42, Figure 3, is carried by the section 40 and serves to support the shovels which are positioned intermediate the central and outermost shovels as viewed in Figure 3. It will be noted that these shovels not only are arranged in staggered relation when viewed transversely of the cultivator reel, but are also arranged in spaced relation when viewed axially of said reel. By this arrangement, I am able to positively avoid the clinging of the soil to the shovels.

It will also be noted that I provide means for adjustably positioning the frame 38 about the pin 33. This means includes a strap or bar 44 which is secured in a fixed position at one extremity upon the handle 24, the opposite or free extremity of the strap being adjustably secured to the frame section 40 by means of a suitable clamping screw 46. This strap 44 is provided with a series of apertures 48 for receiving the clamping screw 46, and in this manner the shovels may be adjusted to any desired position. By merely changing the position of the clamping screw 46 with respect to the strap 44, I am able to position the shovels in accordance with the height of the operator, and also in accordance with the degree of cut which is to be made in the ground by said knives.

From the foregoing it will be apparent that my invention provides a very conveniently operable and economically constructed cultivator. The manner in which the scuffle knife and shovels are mounted, enables said elements to be conveniently adjusted in accordance with the type of work which is to be done and also in accordance with the elevation of the cultivator operating handle. All of the constituent parts may be made by the practice of conventional machine shop methods, and therefore the device is rendered very practical from the manufacturing standpoint. The rigid construction of the device enables the same to be subjected to the severest operating conditions, and adjustments may be made with a minimum amount of effort and skill on the part of the operator.

It should be noted that the support or frame section 42, which is of U-shaped construction, is detachably mounted upon its companion support or frame section 40 by means of suitable bolts 50. These bolts 50 serve the dual function of securing the outermost shovels as well as the supporting frame section 42 in position upon the section 40. By this construction the shovels carried by the support or frame 42 may be removed if necessary. In some instances it may be desirable to use only the shovels carried by the supporting frame section 40, while in other instances it may be desirable to use all of the shovels. It should also be noted that the central shovel is displaced laterally with respect to the outermost shovels, and the shovels carried by the U-shaped frame section 42 are also displaced laterally with respect to the outermost shovels so as to present sufficient space between the shovels.

Obviously changes in the specific described construction may be made without departing from the spirit and scope of the invention, and said invention should be limited only by the scope of the appended claims.

Having thus described my invention, what I claim as new and desire to secure by Letters Patent is:

1. In a garden tool of the class described, a reel including a plurality of soil engaging blades, a support extending laterally of said reel, a shovel carried by said support, a second support detachably mounted on the first mentioned support, and a shovel mounted on said second support.

2. In a garden tool of the class described, a reel including a plurality of soil engaging blades, a support extending laterally of said reel, a plurality of spaced soil engaging shovels mounted on said support, a second support detachably mounted with respect to the first support, and a plurality of spaced shovels carried by said second support.

3. In a garden tool of the class described, a reel including a plurality of soil engaging blades, a support extending laterally of said reel, a plurality of soil engaging shovels carried by said support, a second U-shaped support mounted on the first mentioned support, and a soil engaging shovel carried by said second support.

In witness whereof, I have hereunto subscribed my name.

ALVIN V. ROWE.